(12) United States Patent
Schiffman et al.

(10) Patent No.: US 11,954,236 B2
(45) Date of Patent: Apr. 9, 2024

(54) AUTHENTICITY VERIFICATION

(71) Applicant: Hewlett-Packard Development Company, L.P., Spring, TX (US)

(72) Inventors: Joshua Serratelli Schiffman, Bristol (GB); Carey Huscroft, Bristol (GB); Pierre Belgarric, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 114 days.

(21) Appl. No.: 17/415,189

(22) PCT Filed: Aug. 20, 2019

(86) PCT No.: PCT/US2019/047144
§ 371 (c)(1),
(2) Date: Jun. 17, 2021

(87) PCT Pub. No.: WO2021/034317
PCT Pub. Date: Feb. 25, 2021

(65) Prior Publication Data
US 2022/0171886 A1 Jun. 2, 2022

(51) Int. Cl.
*G06F 21/73* (2013.01)
*G06F 21/44* (2013.01)
*G06F 21/57* (2013.01)

(52) U.S. Cl.
CPC ............ *G06F 21/73* (2013.01); *G06F 21/44* (2013.01); *G06F 21/57* (2013.01); *G06F 2221/2103* (2013.01); *G06F 2221/2113* (2013.01)

(58) Field of Classification Search
CPC .......... G06F 21/73; G06F 21/44; G06F 21/57; G06F 2221/2103; G06F 2221/2113
See application file for complete search history.

(56) References Cited

U.S. PATENT DOCUMENTS

| | | |
|---|---|---|
| 6,701,519 B1 | 3/2004 | Cowan |
| 8,266,676 B2 | 9/2012 | Hardjono et al. |
| 9,111,119 B2 | 8/2015 | Proudler et al. |
| 2007/0124413 A1 | 5/2007 | Diab et al. |
| 2011/0099627 A1 | 4/2011 | Proudler |
| 2013/0097694 A1 | 4/2013 | Dang et al. |
| 2013/0125204 A1 | 5/2013 | La Fever et al. |
| 2013/0125244 A1 | 5/2013 | Sugano |
| 2018/0107844 A1 | 4/2018 | Brown et al. |

FOREIGN PATENT DOCUMENTS

| | | |
|---|---|---|
| EP | 1159660 A1 | 12/2001 |
| EP | 3313080 A1 | 4/2018 |
| WO | 00/54125 A1 | 9/2000 |
| WO | 2019/133869 A1 | 7/2019 |

*Primary Examiner* — Ayoub Alata
(74) *Attorney, Agent, or Firm* — Knobbe, Martens, Olson & Bear, LLP

(57) ABSTRACT

The disclosure provides a method for verifying authenticity of a component in a product. The method may comprise collecting data relating to a characteristic of the component. The method may further comprise comparing the data to a profile for the component. The profile may comprise an expected characteristic for the component. The method may further comprise determining whether the collected data matches the expected characteristic. The disclosure further provides an apparatus and program.

8 Claims, 4 Drawing Sheets

AUTHENTICITY VERIFICATION

BACKGROUND

Electronic devices, such as consumer electronics may be described as platforms or devices and may for example include hardware, software, and data. Such platforms may include components such as a hard drive, CPU, RAM, HID devices, BIOS, and configured settings like serial numbers. Similar devices, such as two PCs may have the same type of hardware, but a different firmware version and serial number.

BRIEF DESCRIPTION OF DRAWINGS

Examples will now be described, by way of non-limiting example, with reference to the accompanying drawings, in which.

DETAILED DESCRIPTION

Electronic products, such as consumer electronics, may be checked at the point of manufacture or assembly to ensure the components of the product are correct, authentic and operating to a specified standard.

Such products may however be modified or replaced after production, but it may be difficult to detect these changes.

In some examples, a platform is a computing device consisting of hardware, software, and data. These components affect the behaviour of the device and thus a device may be characterised by their presence or absence. Each component may display behaviour which is characteristic of that specific component. For example, a memory may behave like a memory, a CPU like a CPU, etc.

In order to improve detection of such changes, in some examples methods of characterizing devices at different levels of granularity may be provided. In accordance with some examples, a device may collect measurements or other data relating to components of the platform. Components may be individually characterised via values, uniquely associated with the components, and/or behavioural patterns. For example, each hardware component may have a serial number and/or manufacturer ID. Software may have version numbers. Other components may demonstrate characteristic behaviours, such as a USB mass storage device which may be expected to act like one by following expected requests.

Figure 1:
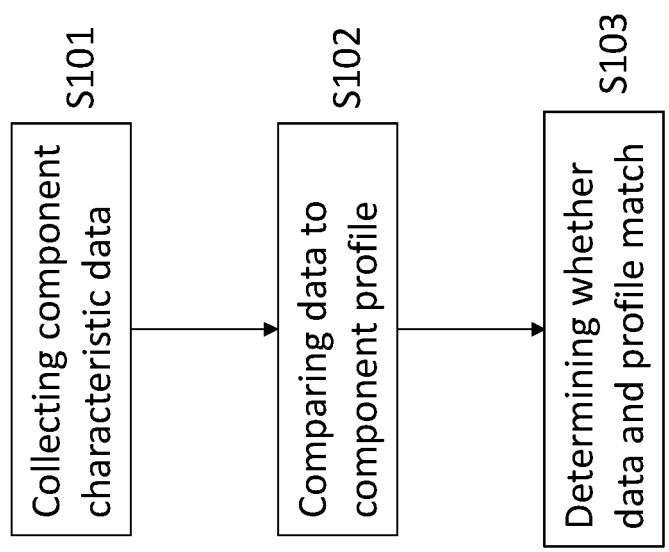
FIG. 1 is a flowchart of an example of a method in accordance with some examples.

In accordance with some examples, and as shown in FIG. 1, there is provided a method for verifying authenticity of a component in a product. The method may comprise collecting data relating to a characteristic of the component S101. The method may further comprise comparing the data to a profile for the component S102. The profile may comprise an expected characteristic for the component. The method may further comprise determining whether the collected data matches the expected characteristic S103.

In accordance with some examples the method may enable the authentication of a product by verifying that it has been unmodified based on a comparison of characteristic data relating to a component with expected characteristics, defined in a profile for the component of the product. The profile may for example include a component configuration/characteristic list or platform configuration list (PCL) associated with the product. Such a list may include all components which are expected to be present in a product, along with expected characteristic data for each component. If a component is present on the PCL, but not detected based on the collected data, there may be a strong indication that the product may have been tempered with.

In some examples, the component or device may be a hardware component. A product may contain at least one component. For example, a product may be a personal computer or laptop. The component may be verified as authentic in the event it is deemed unlikely that the component has been tampered with or replaced based on the above method. If an authorised repair or replacement of a component is carried out, the profile may be updated to reflect the change. Profile updates may be carried out by trusted parties, for example.

Component characteristics may include component behaviour, measured values, version numbers and assigned identification numbers. A profile may include at least one of these characteristics which allow for the identification of a device. Combining characteristics allows for greater identification certainty, meaning that it would be more difficult for unauthorised or malicious components to mimic an authorised component. For example, if a component, such as a hard drive or memory, were to be replaced with an unauthorised component, but showed the "authorised" identification number, the unauthorised component would inevitably demonstrate different behaviour. For example, response time, power usage or run time may differ between otherwise identical devices due to a number of reasons including age, variations during manufacturing, etc.

Collected data may be considered to match the expected characteristics or data relating to the expected characteristics when the data are either identical or similar to within a predetermined threshold tolerance. A tolerance may be set for example to account for the difference in behaviours of a component due to aging.

In some examples, the method may include collecting a set of measured values and behaviours from the component using available interfaces and probes. The method may further include comparing the profile, which may include a platform configuration list (PLC), to the gathered data, or evidence. This comparison may not be an exact matching and can have a degree of compliance to some acceptable characteristics (for example in cases where some data relate to statistical representations, or where the platform configuration list is a set of acceptable characteristics).

In some examples, the component may differ from the expected characteristics in one (or at least not all) category of collected data. For example, a component may have an authorised identification number and may respond to commands in an expected manner, but may consume more power than expected. In this case, the collected data may be determined as not matching the profile.

A platform configuration list may be an aggregation of characteristics that identify the platform. These characteristics may include static and/or dynamic information about each component. This information may be deterministic or statistically representative. Examples of relevant information may be stored values or component behaviour.

In some examples, if the collected data is determined to not match the expected characteristic, the method may further comprise carrying out a verification operation to establish an operating state of the component.

There may be instances where the collected data does not match the expected characteristics. This may suggest that the product has been tampered with, or may indicate that the component has been legitimately replaced or upgraded. Therefore, further action may be taken to establish whether the component is authentic or not.

In some examples, the verification operation includes transmitting to the component a request to carry out a function normally associated with that component.

The function may be based on the expected functionality of the component.

In some examples, if the component is unable to carry out the function, the method may further comprise isolating the component from communication with other components.

If the component is unable to carry out the function, there may be a strong indication that the component is either not authentic or may be malicious. Isolating the component from other components may be one option for addressing the issue. Removing power to the component may be another option. Further options may be to issue a report to an authorised or trusted party. The component may for example then be inspected manually or removed/replaced with an authentic component. The method may then be re-run to verify the authenticity of the replacement component.

In some examples, if the collected data is determined to match the expected characteristic, the method may further comprise updating the profile to include the collected data.

In this way, the profile may become more detailed over time such that it becomes harder for inauthentic devices to copy or mimic the function of the corresponding authentic device without being detected.

In some examples the profile may include data relating to operation parameters, boot time, run time and/or power usage of the component.

Having more than one metric on the basis of which to compare values may improve the quality of the profile and therefore the difficulty for an inauthentic component to continue operating undetected.

In some examples, the determining is carried out by a trusted evaluator located within the product.

Having a local trusted evaluator which carries out the determining may have the added benefit that no external connection is needed to carry out the verification.

In some examples, the profile is created by a trusted evaluator based on a measured or detected characteristic of a component.

The trusted evaluator may itself be a separate hardware component like a microcontroller with the ability to communicate to the component and measurement capabilities of the component and the resources it uses. In some examples, communication to the device can be used to evaluate the component's compliance to expected bus or device protocol standards. In other examples, measurement capabilities could include probes of temperature and power to detect unusual patterns or usage. Further examples include monitoring traffic on the bus lines to the component or storage external to the component. In some examples, the evaluator may be a system BIOS that may be protected through integrity protection mechanism to ensure measurements are trustworthy.

The profile may form a standard against which to compare subsequently collected data. Therefore, the profile may be created by a trusted evaluator, to ensure a specified or predetermined level of accuracy and reliability of data contained in the profile corresponding to expected characteristics.

In some examples, the verification operation includes a challenge-response operation.

A challenge-response authentication may provide a further level of reliability in the outcome of the verification.

In some examples, if the component is verified as authentic based on the verification operation, the method may further comprise updating the profile to include the collected data.

To add the collected data, which based on the verification relates to an authentic component, to the profile may help to build a fuller picture of the characteristics of the component. For example, collecting the data relating to a single component a number of times may allow for temporal changes in the component characteristics to be taken into account. Most components may undergo changes in performance over time. Therefore, in such an example, the age of the component may be estimated.

In some examples, there is provided a program for carrying out the method described above.

In some further examples, there is provided a program for verifying authenticity of a device. The program, when executed on a computer, may cause the computer to carry out a process. The process may comprise comparing data, relating to a characteristic of the device, to a profile for the device. The profile may comprise data relating to an expected characteristic for the device. The process may further comprise determining whether the collected data matches the profile.

Figure 2:
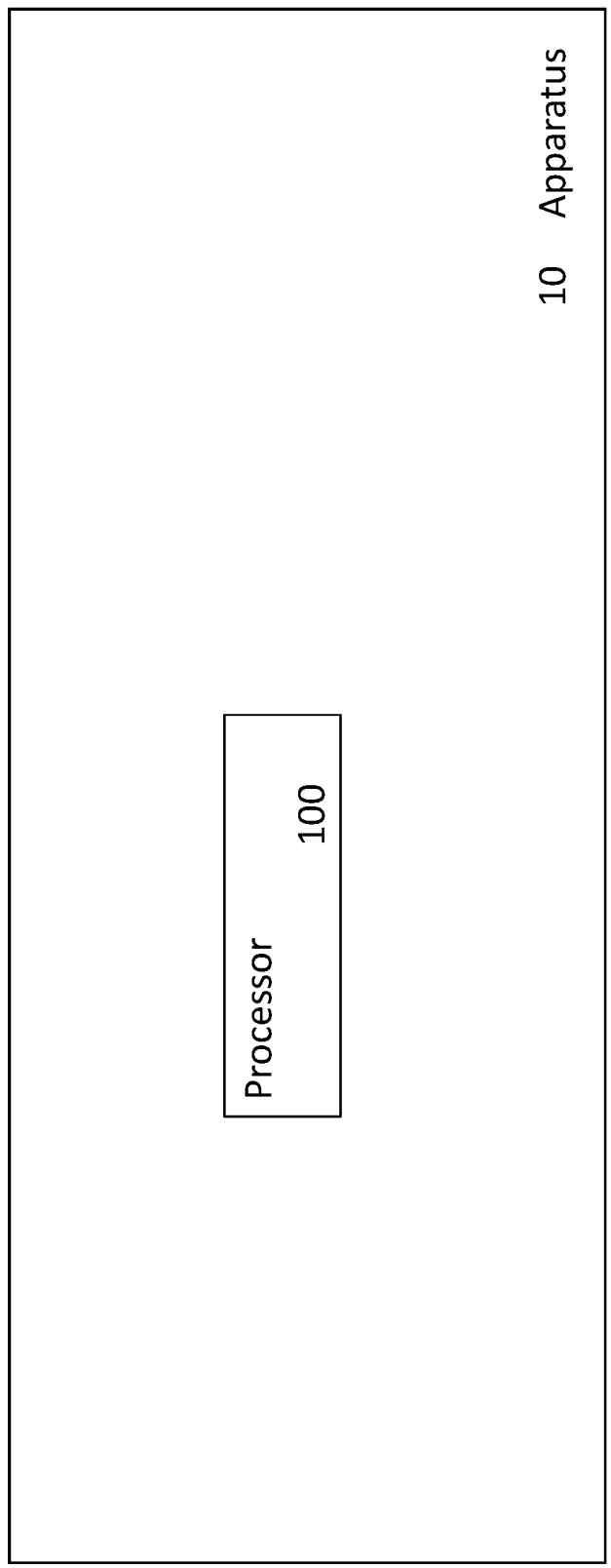
FIG. 2 is a simplified schematic of an example of an apparatus in accordance with some examples.

In some examples, as shown in FIG. 2, there is provided an apparatus 10 for verifying authenticity of a device. The apparatus 10 may comprise a processor 100 to compare collected data, relating to characteristics of the device, to a profile for the device. The profile includes profile data relating to an expected characteristic for the device. The processor 100 may further determine whether the collected data matches the profile data.

In accordance with some examples, the device may be hardware such as a CPU, a memory, an input device or an output device. The processor 100 may include a data collector and/or data profiler.

Figure 3:
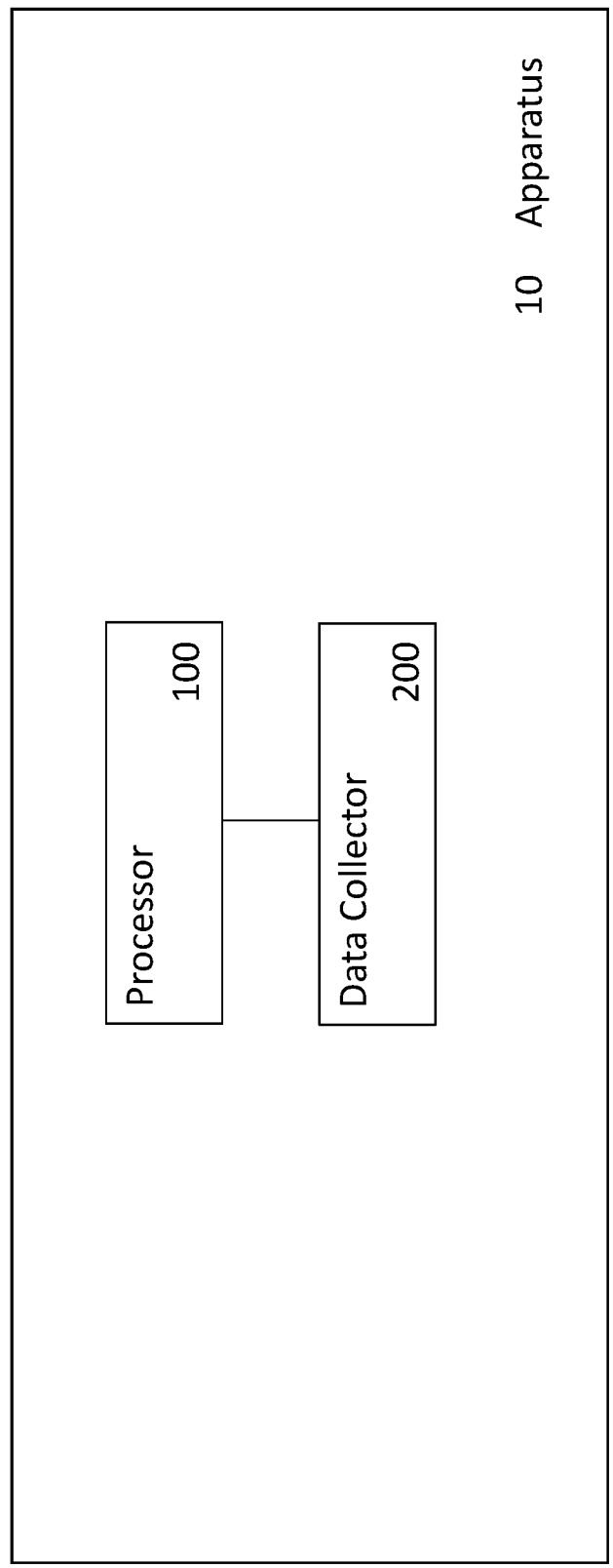
FIG. 3 is a simplified schematic of a further example of an apparatus in accordance with some examples.

In some examples, as shown in FIG. 3, the apparatus 10 may further comprise a data collector 200, separate to the processor 100, to collect the data relating to characteristics of the component.

In some examples, the processor 100 may carry out challenge-response-type authentication, if the collected data is determined not to match.

In some examples, if the component is verified as authentic based on the challenge-response-type authentication, the processor 100 may update the profile to include the collected data.

In some examples, when a profile or PCL is updated, it may be versioned, or time stamped. An updated profile may be accepted, for example, if the profile is authorized, e.g. signed by an authority, and the version or time stamp is newer than the existing profile or list. An updated profile may for example not be accepted if the profile version number or time stamp is not newer than the existing profile or list.

In creating a profile for a component, characteristics of the component are collected or read and stored for example as a list for future comparison. Updating the list may need explicit authorization by a trusted party. The profile may include a component characteristics list based on a list of components ordered and inserted into the product, for example as taken from a contractual agreement.

In some examples, the list could be gathered in a factory and certified by the original equipment manufacturer (OEM).

In some examples, there may be several methods for measuring or collecting component data. In one example, a cryptographic identity may be used, such as a certified identity authenticated using a cryptographic protocol and a secret key held in the component. For example, a component could be provisioned with a secret key on a per device or device family basis. A component authentication protocol such as USB Type-C, may be an example of this method.

In some examples, the method may include monitoring the behaviour of the components or their IOs (input/outputs) using component instrumentation. The behaviour may, in one example, be monitored by a trusted evaluator. This may guarantee for example that the component behaves in a way that conforms to expectations (e.g., as a hard drive or to a specified level of performance). By these examples, it becomes more difficult for a rogue device to implement functionality that differs significantly from the expected one.

In some examples, the component may be actively probed. For example, the component could be sent cryptographic challenge-response authentication-type challenges. It may be possible to actively test the behaviour of the component by sending inputs and testing its outputs. It may also be possible to check that the component is at a given location on the motherboard, for example by timing a challenge-response. In some examples, the component may perform a signature operation on a challenge provided by a trusted verifier.

In some examples, a boot time evaluation may be carried out. Secure boot mechanisms may aim to prevent compromised devices from using keys and secrets intended for the correctly functioning device. In an example, the boot time evaluation may supplement a secure boot mechanism to ensure that components have not been altered. In some examples, a runtime evaluation may be carried out. Some components may always be needed such as a user authentication component or antivirus capabilities. If this component is removed or compromised, results of the evaluation may trigger remediation like halting sensitive tasks or prompting the user to replace the component. In some examples, an on-demand evaluation may be carried out.

Figure 4:
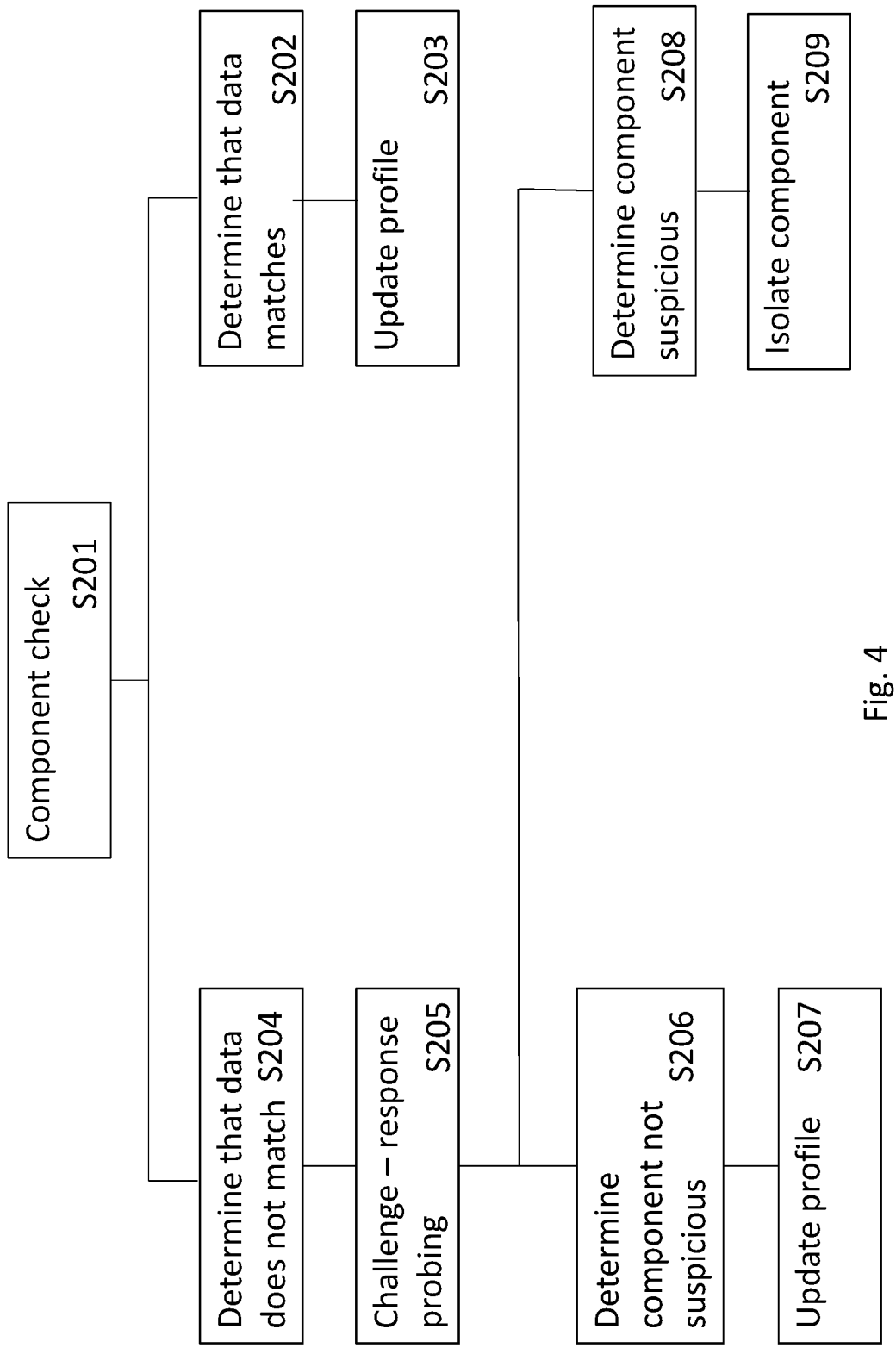
FIG. 4 is a flowchart of a further example of a method in accordance with some examples.

In some examples, as shown in FIG. 4, there is provided a method comprising carrying out a component check S201. The component check may correspond to the method described in relation to FIG. 1. Based on the comparison of collected data to data contained in a profile, it may be determined that the data matches S202. If the data is determined to match, the profile may be updated S203 to include the collected data.

If it is determined that the data does not match S204, the method may proceed towards carrying out challenge-response probing S205. On the basis of the challenge-response probing, it may be determined that a component is not suspicious S206. In this case, for example, the component may behave in an expected manner and give the expected responses to the issued challenges. If the component is determined not to be suspicious, the profile may be updated S207 to include the collected data and the responses to the challenges posed.

It may be determined, on the basis of the challenge-response probing, that the component is suspicious S208. If the component is determined to be suspicious, the component may be isolated S209 from the rest of the product. In some examples, alternative actions may be taken in response to a suspicious component. For example, a product or a component may be rebooted, if a component is determined to be suspicious.

In accordance with some examples, suspicious components may be safely isolated from the other components of the product and non-suspicious components may provide data contributing to a more complete profile of the component leading to greater security.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for verifying authenticity of a component in a product, the method comprising:
   collecting data, wherein the data comprises a characteristic of the component, and wherein the characteristic is associated with a behavioral pattern of the component;
   comparing the data to a profile for the component, which profile comprises an expected characteristic for the component;
   determining whether the collected data matches the expected characteristic;
   in response to the collected data being determined to not match the expected characteristic, carrying out a verification operation to establish an operating state of the component, wherein the verification operation includes a challenge-response operation; and
   in response to the component being verified as authentic based on the verification operation, updating the profile to include the collected data.

2. The method of claim 1, wherein the verification operation includes transmitting to the component a request to carry out a function normally associated with that component.

3. The method of claim 1, wherein the profile includes data relating to operation parameters, boot time, run time and/or power usage of the component.

4. The method of claim 1, wherein the determining is carried out by a trusted evaluator located within the product.

5. The method of claim 1, wherein the profile is created by a trusted evaluator based on a measured or detected characteristic of a component.

6. A computer-implemented method for verifying authenticity of a device comprising:
   as implemented by a computing device comprising one or more processors,
      comparing collected data to a profile for the device, the profile comprising data relating to an expected characteristic for the device, wherein the collected data comprises a characteristic of the device, and wherein the characteristic is associated with a behavioral pattern of the device;
      determining whether the collected data matches the profile;
      in response to the collected data being determined to not match the expected characteristic, carrying out a verification operation to establish an operating state of the device, wherein the verification operation includes a challenge-response operation; and
      in response to the challenge-response operation indicatinq the device is suspicious, isolating the device from communication with other devices.

7. An apparatus for verifying authenticity of a device, the apparatus comprising:
   a processor to compare collected data, comprising characteristics of the device, to a profile for the device, which profile includes profile data relating to an expected characteristic for the device, to determine whether the collected data matches the profile data, wherein the characteristics of the device are associated with a behavioral pattern of the device, in response to the collected data being determined to not match the expected characteristic, carry out a verification operation to establish an operating state of the device, wherein the verification operation includes a challenge-response type authentication, and in response to the device being verified as authentic based on the verification operation, update the profile to include the collected data.

8. The apparatus of claim 7, further comprising:
   a data collector software module to collect the collected data comprising characteristics of the device.

* * * * *